United States Patent
Choi

(10) Patent No.: US 8,082,437 B2
(45) Date of Patent: Dec. 20, 2011

(54) COMPUTER HAVING FLASH MEMORY AND METHOD OF OPERATING FLASH MEMORY

(75) Inventor: Byung Yoon Choi, Seoul-si (KR)

(73) Assignee: LG Electronics Inc., Seoul (KR)

( * ) Notice: Subject to any disclaimer, the term of this patent is extended or adjusted under 35 U.S.C. 154(b) by 792 days.

(21) Appl. No.: 12/175,180

(22) Filed: Jul. 17, 2008

(65) Prior Publication Data
US 2009/0024843 A1     Jan. 22, 2009

(30) Foreign Application Priority Data
Jul. 19, 2007    (KR) .................. 10-2007-0072433

(51) Int. Cl.
     *G06F 15/177*     (2006.01)
(52) U.S. Cl. ................. 713/2; 713/1; 713/100
(58) Field of Classification Search .......... None
See application file for complete search history.

(56) References Cited

U.S. PATENT DOCUMENTS

| 5,860,083 | A | 1/1999 | Sukegawa |
| 6,950,919 | B2 * | 9/2005 | Sharma et al. ............. 711/170 |
| 7,054,990 | B1 | 5/2006 | Tamura et al. |

FOREIGN PATENT DOCUMENTS
EP      1 804 169 A1    7/2007
* cited by examiner

*Primary Examiner* — Dennis M Butler
(74) *Attorney, Agent, or Firm* — Birch, Stewart, Kolasch & Birch, LLP

(57) ABSTRACT

Provided is a method of variably establishing storage areas of a flash memory according to the status of a system in a computer having flash memory in which booting data and execution data are stored. The computer includes: a flash memory including a storage area that is divided into a boot area for storing booting data and a cache area for storing execution data, and supplementing a reading speed of a main storage device; a flash controller designating a location to which the data stored in the flash memory is written; and a main controller calculating an area ratio of the flash memory according to the operating status of a PC, controlling the flash controller, and reestablishing the area ratio between the boot area and the cache area.

12 Claims, 3 Drawing Sheets

– Flash Memory –

COMPUTER HAVING FLASH MEMORY AND METHOD OF OPERATING FLASH MEMORY

CROSS REFERENCE TO RELATED APPLICATIONS

The present application is related to, and claims priority to, Korean patent application 10-2007-0072433, filed on Jul. 19, 2007, the entire contents of which are hereby incorporated by reference.

BACKGROUND OF THE INVENTION

1. Field of the Invention

The present invention relates to a method of variably establishing storage areas of a flash memory according to the status of a system in a computer having a flash memory in which booting data and execution data are stored.

2. Description of the Related Art

As generally known in the art, a random access memory (RAM) is used as a main memory device of a computer. Although RAM can read and write data fast, the data is lost after power is switched off. Thus, since data is permanently stored in a hard disk with a slow speed, necessary data is loaded to RAM when the computer system operates.

However, the data needs to be moved from the hard disk when an application is executed right after the computer system is booted, which causes a reduction in the executing speed of the computer.

In more detail, when the hard disk transmits the data, since a transmission time is delayed due to a mechanical operating part of the hard disk, a central processing unit (CPU) is quite faster than the hard disk, and a difference in the data transmission speed causes a bottleneck state, which reduces the operating speed of the computer.

Therefore, the computer system includes another storage means for sharing a part of the data with the hard disk, supporting the hard disk, maintaining the data when the power is turned off, and transmitting the data faster than the hard disk, so that the operating speed of the computer can be increased.

Recently, a variety of non-volatile memory devices other than the hard disk have been developed. In addition to flash memory, various read only memory (ROM), phase-change RAM (PRAM), resistive RAM (ReRAM), magneto-resistance RAM (MRAM), etc. technologies have been developed, so that these ROM, PRAM, and ReRAM can be expected to serve as devices that support the hard disk.

The hard disk and other non-volatile memory devices store data basically required for operation of the computer and frequently used data. When the data stored in the non-volatile memory devices is required, the data is supplied from the non-volatile memory devices other than the hard disk.

The non-volatile memory devices invariably establish a storage space for storing the data required to operate the computer and another storage space for storing the data having the high use frequency, which results in problems of the above conventional technology as described below.

Although the basically required data for operation of the computer is unnecessary after the computer is fully operational, the data occupies a part of the storage space of the non-volatile memory devices, which relatively reduces the storage space for storing the data having the high use frequency.

Further, according to the prior art, in order to always store the data basically required to operate the computer while securing a sufficient storage space for storing the frequently used data, it is necessary to increase the capacity of the non-volatile memory devices.

SUMMARY OF THE INVENTION

Accordingly, the present invention has been made to solve the above-mentioned problems occurring in the prior art, and an object of the present invention is to provide a computer having a flash memory capable of variably changing storage areas according to the status of a computer system.

In order to accomplish this object, there is provided a computer including: a flash memory including a storage area that is divided into a boot area for storing booting data and a cache area for storing execution data, and supplementing a reading speed of a main storage device; a flash controller designating a location to which the data stored in the flash memory is written; and a main controller calculating an area ratio of the flash memory according to the operating status of a PC, controlling the flash controller, and reestablishing the area ratio between the boot area and the cache area.

The main controller may establish the area ratio as an operating status when the PC is fully operational.

In the operating status, the area ratio may have a greater cache area than the boot area.

In the operating status of the PC, the main controller may establish the area ratio in such a manner that all storage areas of the flash memory include the cache area.

The main controller may establish the area ratio as a standby status when the PC is powered off.

In the standby status, the area ratio may have a greater boot area than the cache area.

In the standby status of the PC, the main controller may establish the area ratio in such a manner that all storage areas of the flash memory include the boot area.

The main controller reestablishes the area ratio of the flash memory according to a change in a mode of the PC depending on an idle time that continues without a user's input.

The mode may include a monitor off mode and a power saving mode.

The main controller may establish the area ratio of the flash memory as an establishing status 1 when the mode is established as the monitor off mode, and an establishing status 2 when the mode is established as the power saving mode, wherein the boot area is greater in the establishing status 2 than in the establishing status 1.

In the establishing status 1, the storage area of the flash memory may be equally allocated as the boot area and the cache area.

In the establishing status 2, the storage area of the flash memory may be wholly allocated as the boot area.

In accordance with another aspect of the present invention, there is provided a method of operating a flash memory in a computer having flash memory that includes a storage area that is divided into a boot area for storing booting data and a cache area for storing execution data, and supplements a reading speed of a main storage device, the method including steps of: establishing an area ratio of the flash memory as an operating status after a PC has been fully operational; when a power off signal is detected, establishing the area ratio of the flash memory as a standby status; and when the area ratio of the flash memory is established as the standby status, storing booting data in the boot area of the flash memory.

In the operating status of the PC, the area ratio may be established in such a manner that the cache area is greater than the boot area, and all storage areas of the flash memory include the cache area.

In the standby status of the PC, the area ratio may be established in such a manner that the boot area is greater than the cache area, and all storage areas of the flash memory include the boot area.

The PC may be operated according to the booting data stored in the boot area.

In accordance with another aspect of the present invention, there is provided a method of operating a flash memory in a computer having the flash memory that includes a storage area divided into a boot area for storing booting data and a cache area for storing execution data, and supplements a reading speed of a main storing device, the method including the steps of: establishing an area ratio of the flash memory as an operating status after a PC has been fully operational; when the PC enters a monitor off mode, reestablishing the area ratio of the flash memory as an establishing status 1, and performing the monitor off mode; and when the PC enters a power saving mode according to an idle time, reestablishing the area ratio of the flash memory as an establishing status 2, and performing the power saving mode.

The step of reestablishing the area ratio of the flash memory as the establishing status 1 may include: determining whether the idle time exceeds an established time 1; if the idle time exceeds the established time 1, establishing the area ratio of the flash memory as the establishing status 1, and turning off a monitor; and determining whether there is a user's input, and if the user's input exists, establishing the area ratio of the flash memory as the operating status.

In the established time 1, the PC may enter the monitor off mode established by the user, and in the establishing status 1, the storage area of the flash memory may be equally allocated as the boot area and the cache area.

The step of reestablishing the area ratio of the flash memory as the establishing status 2 may include: determining whether the idle time exceeds an established time 2; if the idle time exceeds the established time 2, establishing the area ratio of the flash memory as the establishing status 2; storing the booting data in the boot area of the flash memory; terminating the operation of a hard disk drive (HDD) and entering the power saving mode; and determining whether there is a user's input, and if the user's input exists, establishing the area ratio of the flash memory as the operating status.

In the established time 2, the PC may enter the power saving mode established by the user, and in the establishing status 2, the storage area of the flash memory may be wholly allocated as the boot area.

The method may further include: determining whether the idle time exceeds an established time 3; if the idle time exceeds the established time 3, booting a system of the PC; storing data stored in a random access memory (RAM) in a non-volatile storage space; and turning off the system.

The established time 3 refers to an idle time taken until the system enters a maximum power saving mode.

The non-volatile storage space may be the boot area of the HDD or the flash memory.

In accordance with another aspect of the present invention, there is provided a method of operating a flash memory in a computer having flash memory that includes a storage area that is divided into a boot area for storing booting data and a cache area for storing execution data, wherein an area ratio of the flash memory is variably established according to an operating status of a PC.

The operating status of the PC may be identified according to the PC that is powered on or off.

The operating status of the PC may be identified according to a system mode of the PC.

The area ratio of the flash memory may be determined according to whether the booting data is necessary for a next operating status of the PC, and when the booting data is necessary for the next operating status of the PC, the boot area may be established to be greater than the cache area.

According to the present invention as described above, it is possible to change a storage area of a single flash memory according to the use state thereof, which enables more efficient and wide use of the storage area of the flash memory.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
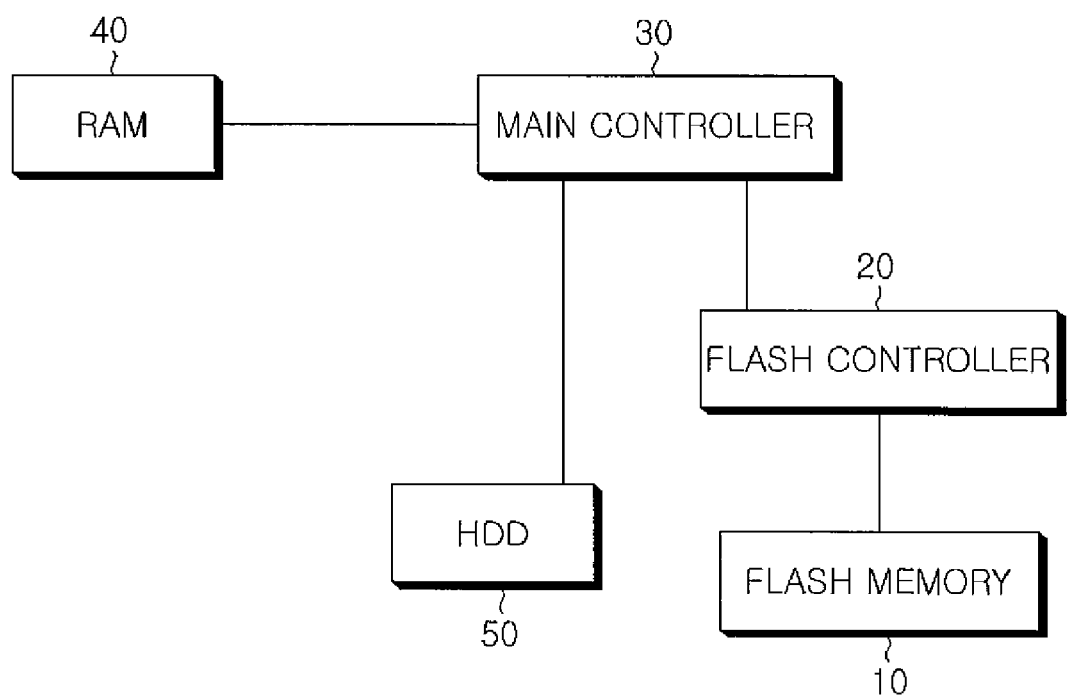
FIG. 1 is a block diagram of a computer having a flash memory according to an embodiment of the present invention.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 2:
FIG. 2 is a conceptual diagram of storage areas of flash memory according to an embodiment of the present invention.

FIG. 1 is a block diagram of a computer having a flash memory 10 according to an embodiment of the present invention. FIG. 2 is a conceptual diagram of storage areas of the flash memory 10 according to an embodiment of the present invention.

Referring to FIG. 1, the computer includes the flash memory 10 for storing booting data and execution data. The flash memory 10 is used to supplement a speed of reading data of a main storage device (a hard disk drive (HDD), etc.) to memory (representative, dynamic random access memory (DRAM)). The booting data refers to data necessary for operating a system after the computer is booted. The execution data refers to data which has been frequently used by a user and is thus highly probable to be executed by the user in executing the user's instruction after the operation of the system.

The flash memory 10 has separate areas for storing the booting data and the execution data. Hereinafter, an area for storing the booting data is a "boot area," and an area for storing the execution data is a "cache area."

The sizes of the boot area and the cache area are not fixed but are determined by a flash controller 20 connected to the flash memory 10. In more detail, the flash controller 20 determines data storing locations, and is controlled by a main controller 30 that will be described later (see FIG. 2).

As described above, the main controller 30 determines an area ratio between the boot area and the cache area according to an operation status of the system to the flash controller 20.

The main controller 30 can establish the area ratio of the flash memory 10 in various ways according to the operating status of the system. However, the following description is given on an example in which the area ratio is established when the system is turned on/off and a mode changes according to idle time.

First, the main controller 30 establishes the area ratio differently when a PC is operational and when a user uses the PC after having been operated.

In more detail, when the PC is operated, the flash memory 10 stores data necessary for operating the PC so as to increase an operating speed. Therefore, all of the storage space of the flash memory 10 should be allocated as the boot area. Further, booting data should be stored in the booting area.

However, if the booting data is stored in the booting area after an instruction for operating the PC is input, such a storing process will result in decrease in the operating speed of the system. Therefore, when an instruction for terminating the system is input, the main controller 30 allocates the storage areas of the flash memory 10 as the boot area and stores the booting data in the boot area, before the system is terminated.

Also, after the PC is fully operational, the main controller 30 allocates all the storage areas of the flash memory 10 as the cache area. Thereafter, the main controller 30 stores data (whose priority is determined according to an execution frequency) executed by the user so as to increase the operating speed of the system when the data is executed.

Then, the main controller 30 changes the area ratio of the flash memory 10 in accordance with a change in the system mode according to idle time that continues without a user's input.

In more detail, when the PC is changed to a monitor off mode, the main controller 30 establishes the area ratio of the flash memory 10 in such a manner that the boot area and the cache area are identical to each other.

When the idle time further continues and the PC enters a power saving mode, the main controller 30 allocates all the storage areas of the flash memory 10 as the boot area, and stores the booting data in the boot area.

Meanwhile, when the idle time further continues and the PC enters a maximum power saving mode, the main controller 30 can store data stored in a RAM 40 of the PC in the flash memory 10. In this regard, when the PC exits the maximum power saving mode, the main controller 30 stores the data stored in the RAM 40 in the flash memory 10 providing a fast access speed in order to return the PC to the status before entering the maximum power saving mode.

Of course, the data of the RAM 40 can be stored in a HDD 50 in the same manner as the conventional method.

Hereinafter, a method of operating the flash memory 10 of an embodiment of the present invention will now be described in detail.

Figure 3:
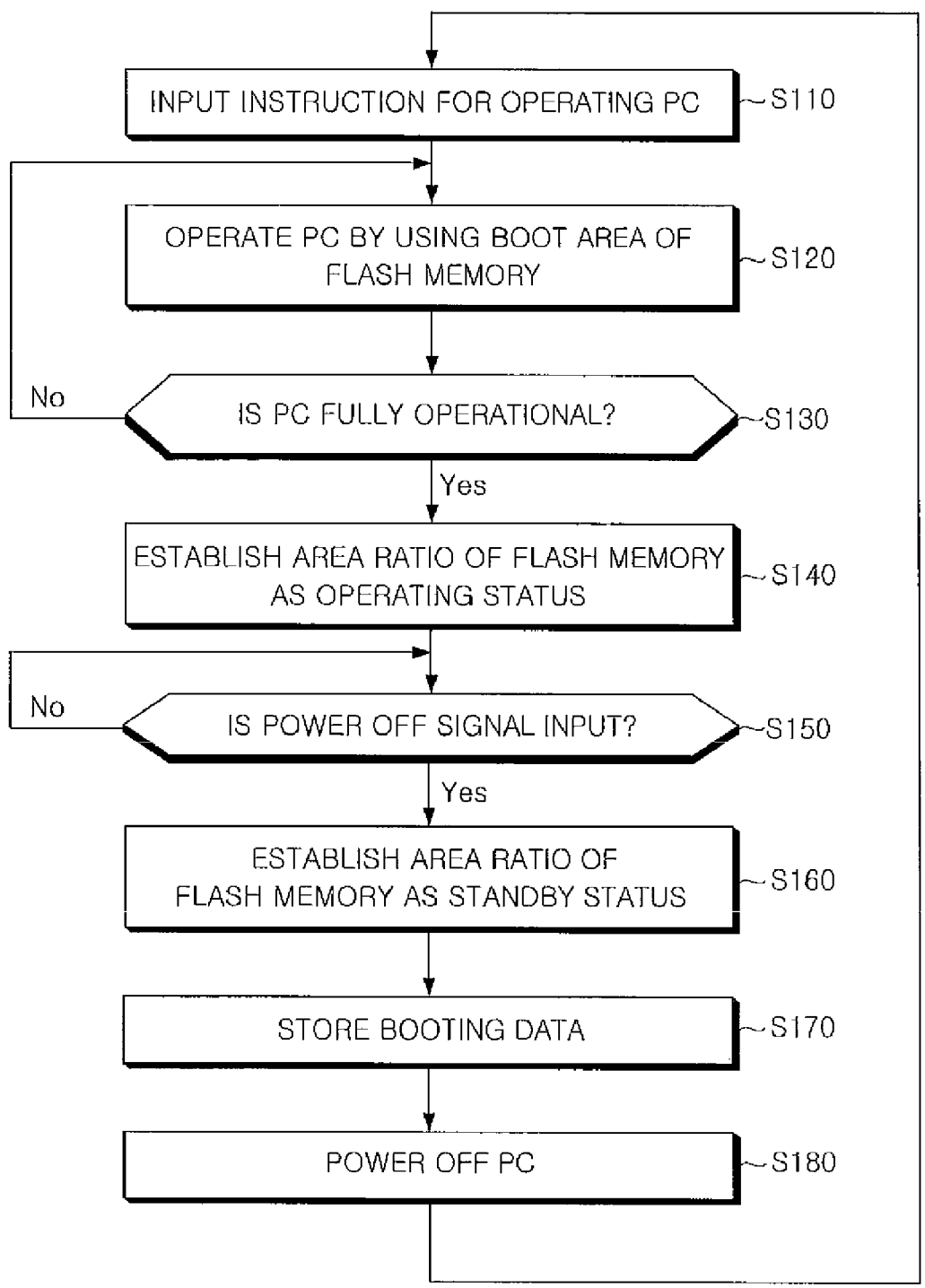
FIG. 3 is a flowchart illustrating a method of operating flash memory according to an embodiment of the present invention.

FIG. 3 is a flowchart illustrating the method of operating the flash memory 10 according to an embodiment of the present invention.

As shown, the method of operating the flash memory 10 of the present embodiment receives an instruction for operating a PC (step S110).

The main controller 30 having received the instruction for operating the PC operates the PC. The main controller 30 accesses a boot area of the flash memory 10 and operates the PC by using boot data stored in the boot area (step S120).

Thereafter, when the PC is fully operational (step S130), the main controller 30 establishes an area ratio between the boot area and the cache area of the flash memory 10 to have a value corresponding to an operating status (step S140).

The operating status refers to an area ratio suitable for executing a user's instruction in that the cache area is established to be greater than the boot area. More dramatically, all storage areas of the flash memory 10 can be established as the cache area.

After the main controller 30 establishes the area ratio of the flash memory 10 as the operating status, the main controller 30 receives and performs the user's instruction, and stores data executed according to the user's instruction in the cache area. The priority of the data stored in the cache area is determined according to a frequency of executing the data performed by the user. In more detail, since data is more frequently executed by the user, the data is determined to have a higher execution possibility, and as such, the data is first stored in the cache area.

Thereafter, the user detects whether a power off signal is input (step S150).

If the power off signal is input, the main controller 30 establishes the area ratio of the flash memory 10 as a standby status (step S160).

The standby status refers to an area ratio suitable for storing booting data required to operate the PC in that the boot area is established to be greater than the cache area. More dramatically, all storage areas of the flash memory 10 can be established as the boot area.

After the area ratio of the flash memory 10 is established to the standby status, the main controller 30 stores the booting data in the boot area (step S170).

The PC is powered off and the system is terminated (step S180).

Figure 4:
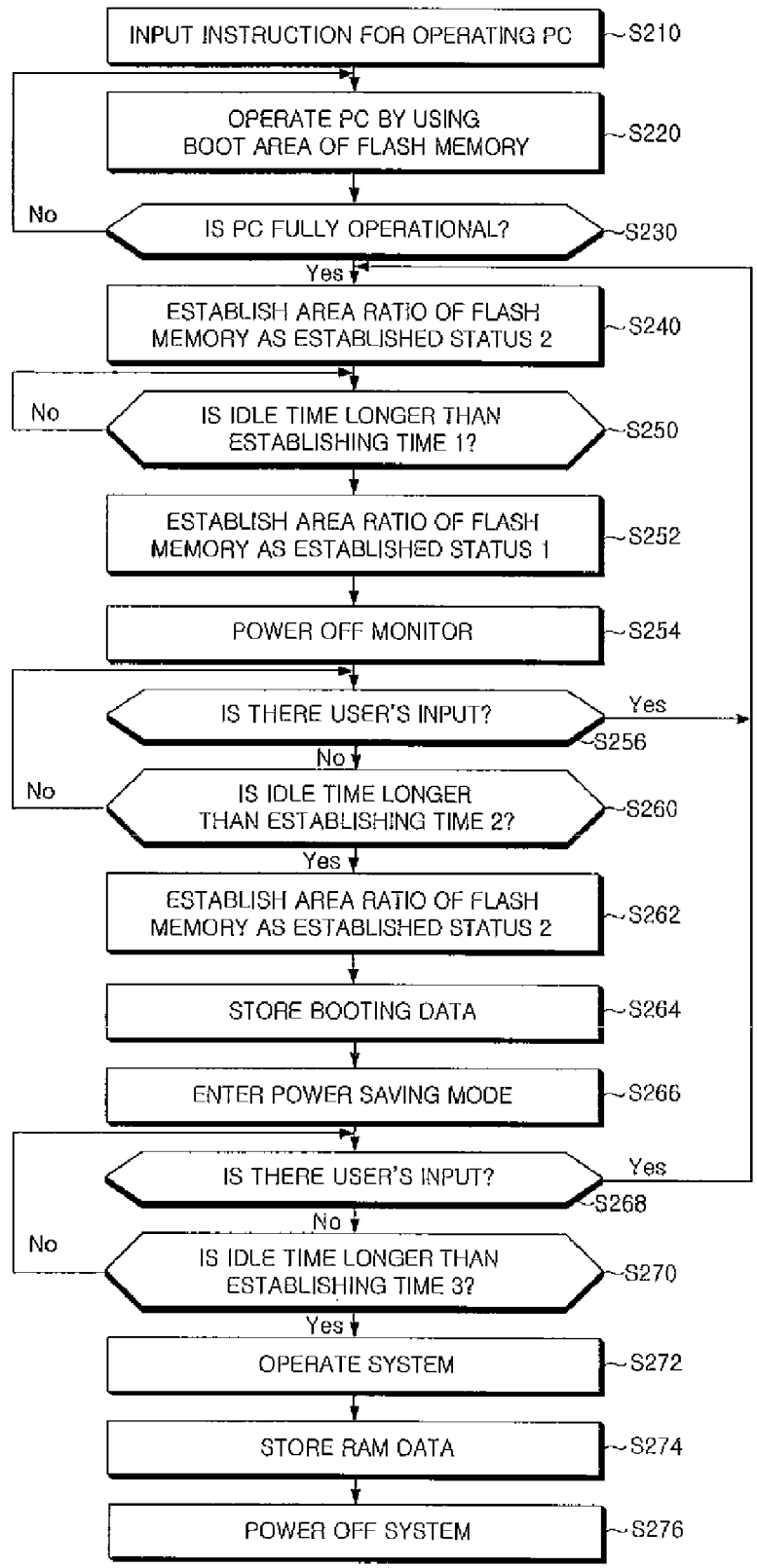
FIG. 4 is a flowchart illustrating a method of operating flash memory according to another embodiment of the present invention.

FIG. 4 is a flowchart illustrating a method of operating the flash memory 10 according to another embodiment of the present invention.

Referring to FIG. 4, the method of operating the flash memory 10 of the present embodiment receives an instruction for operating a PC (step S210) in the same manner as described with reference to FIG. 3. The main controller 30 having received the instruction for operating the PC operates the PC (step S220). If the PC is fully operational, the main controller 30 establishes an area ratio between a boot area and a cache area of the flash memory 10 as an operating status (steps S230 and S240).

The main controller 30 counts idle time that continues without a user's input. The counting of the idle time is required to change a mode of the PC, which reduces power consumption when a system is maintained without any user input.

If the idle time exceeds an established time 1 (step S250), the main controller 30 establishes the area ratio of the flash memory 10 to an establishing status 1 (step S252). At the established time 1, the system enters a monitor off mode. In the establishing status 1, the boot area and the cache area are established to have the same area ratio. Alternatively, the boot area and the cache area can be established to have a similar area ratio, in order to prepare the system of the PC that enters a sleep mode and terminates the monitor off mode.

The main controller 30 turns off a monitor of the PC (step S254), detects whether the user inputs an instruction, and enters a standby mode (step S256). If the main controller 30 detects that the user inputs the instruction, the main controller 30 exits the monitor off mode (turns on the monitor), and proceeds to step S240.

Meanwhile, if the idle time exceeds an established time 2 without a user input (step S260), the main controller 30 establishes the area ratio of the flash memory 10 to an establishing status 2 (step S262). At the established time 2, the system enters a power saving mode.

In the establishing status 2, the area ratio of the flash memory 10 is established to have the boot area to be greater than the cache area. In the establishing status 2, all storage areas of the flash memory 10 are established as the boot area.

The main controller 30 stores booting data in the boot area (step S264), and enters the power saving mode (step S266). At this time also, the main controller 30 enters the standby mode while monitoring if the user inputs an instruction (step S268).

Thereafter, the main controller 30 detects if the idle time exceeds an established time 3 (step S270). The established time 3 refers to an idle time taken until the system enters a maximum power saving mode. The established time 1, 2, and 3 can be established and changed by the user.

If the main controller 30 detects in step S270 that the idle time exceeds the established time 3, the main controller 30 operates the system (step S272), in order to completely turn the system off after storing a final status of the PC, which is stored in the RAM 40, in a non-volatile memory (steps S274 and S276).

The non-volatile memory refers to the HDD 50 included in the computer.

However, in the present embodiment, the PC further includes the flash memory 10 as the non-volatile memory. Therefore, the data of the RAM 40 can be stored in the flash memory 10.

It is efficient to store the data of the RAM 40 in the boot area of the flash memory 10.

According to an embodiment of the present invention having the above described construction, a single flash memory is used to variably change storage spaces thereof according to a use status of a PC, thereby increasing available storage spaces.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A computer including a main storage device, comprising:
   a flash memory including a storage area that is dividable into a boot area arranged to store booting data and a cache area arranged to store execution data; and
   a flash controller configured to designate a location in the flash memory to which data is to be written; and
   a main controller configured to
      set a ratio between the boot area and the cache area of the flash memory so that the cache area is larger than the boot area when the computer is fully operational and so that the boot area is larger than the cache area just before the computer is powered off, and
      store a booting date in the boot area.

2. The computer as claimed in claim 1, wherein the main controller is configured to subsequently set the ratio so that all of the storage space of the flash memory is allocated as the cache area.

3. The computer as claimed in claim 1, wherein the main controller is configured to set the ratio so that all of the storage space of the flash memory is allocated as the boot area just before the computer is powered off.

4. A computer including a main storage device, comprising:
   a flash memory including a storage area that is dividable into a boot area arranged to store booting data and a cache area arranged to store execution data; and
   a flash controller configured to designate a location in the flash memory to which data is to be written; and
   a main controller configured to
      dynamically change the ratio according to a mode of the computer, wherein the mode comprises one of a monitor off mode and a power saving mode, and
      set a ratio between the boot area and the cache area of the flash memory to be a first ratio in which the storage area of the flash memory is equally allocated between the boot area and the cache area during the monitor off mode, and a second ratio in which the boot area is larger than the cache area during the power saving mode.

5. The computer as claimed in claim 4, wherein 100% of the storage area of the flash memory is allocated to the boot area in the second ratio.

6. A method of supplementing a reading speed of a main storage device of a computer having a flash memory, the flash memory including a storage area that is dividable into a boot area for storing booting data and a cache area for storing execution data, the method comprising steps of:
   establishing an operational ratio between the boot area and the cache area of the flash memory so that the cache area of the flash memory is larger than the boot area after the computer has become fully operational; and
   establishing a standby ratio between the boot area and the cache area of the flash memory so that the boot area of the flash memory is larger than the cache area when a power off signal is detected, and storing the booting data in the boot area of the flash memory.

7. The method as claimed in claim 6, further comprising:
   operating the computer according to the booting data stored in the boot area.

8. A method of supplementing a reading speed of a main storage device of a computer having a flash memory, the flash memory including a storage area that is dividable into a boot area for storing booting data and a cache area for storing execution data, the method comprising steps of:
   establishing an operational ratio between the boot area and the cache area of the flash memory so that the cache area of the flash memory is larger than the boot area after the computer has become fully operational; and
   establishing a first standby ratio between the boot area and the cache area of the flash memory so that the storage area of the flash memory is allocated equally into the boot area and the cache area when an idle time exceeds a first predetermined time and turning off a monitor; and
   establishing a second standby ratio between the boot area and the cache area of the flash memory so that a whole storage area of the flash memory is allocated to the boot area when the idle time exceeds a second predetermined time.

9. The method as claimed in claim 8, further comprising:
   reestablishing the operational ratio when a user's input is detected.

10. The method as claimed in claim 8, further comprising:
    storing the booting data in the boot area of the flash memory, and
    terminating the operation of a hard disk drive after establishing the second standby ratio; and
    reestablishing the operational ratio when a user's input is detected.

11. The method as claimed in claim 10, further comprising:
    booting a system of the computer when the idle time exceeds a third predetermined time;
    storing data stored in a random access memory (RAM) in a non-volatile storage space; and
    turning off the system.

12. The method as claimed in claim 11, wherein the non-volatile storage space is a boot area of the HDD or the flash memory.

* * * * *